United States Patent [19]

Becker et al.

[11] Patent Number: 4,922,120
[45] Date of Patent: May 1, 1990

[54] BRAKE SYSTEM WITH SLIP CONTROL

[75] Inventors: Horst-Peter Becker, Frankfurt am Main; James Remfrey, Oberursel; Gottfried Dehio, Frankfurt am Main, all of Fed. Rep. of Germany

[73] Assignee: Alfred Teves GmbH, Frankfurt am Main, Fed. Rep. of Germany

[21] Appl. No.: 237,587

[22] Filed: Aug. 26, 1988

[30] Foreign Application Priority Data

Aug. 28, 1987 [DE] Fed. Rep. of Germany ....... 3728783
Sep. 4, 1987 [DE] Fed. Rep. of Germany ....... 3729543

[51] Int. Cl.$^5$ .......................... B60T 8/44; B60T 15/12; B60T 11/20
[52] U.S. Cl. ...................................... 303/114; 303/54; 188/359; 60/562
[58] Field of Search ....................... 303/50, 52, 54, 68, 303/71, 113, 114, 116, 119; 188/355, 356, 357, 358, 359, 360, 181 A; 60/545, 562, 566, 589

[56] References Cited

U.S. PATENT DOCUMENTS

| | | | |
|---|---|---|---|
| 2,318,756 | 5/1943 | Chouings | 188/359 |
| 3,159,974 | 12/1964 | Rodgers | 60/562 |
| 3,162,018 | 12/1964 | Daley, Jr. | 60/562 |
| 3,412,557 | 11/1968 | Williams | 60/562 |
| 4,004,425 | 1/1977 | Pickering | 60/562 |
| 4,132,073 | 1/1979 | Ewald | 60/562 |
| 4,416,491 | 11/1983 | Belart et al. | 303/114 X |
| 4,598,955 | 7/1986 | Belart et al. | 303/114 |
| 4,640,558 | 2/1987 | Nomura et al. | 303/119 |
| 4,776,645 | 10/1988 | Seibert et al. | 303/119 |
| 4,803,840 | 2/1989 | Seibert et al. | 60/545 |
| 4,812,723 | 3/1989 | Shimizu | 303/114 X |

Primary Examiner—Andres Kashnikow
Assistant Examiner—Timothy Newholm
Attorney, Agent, or Firm—Robert P. Seitter

[57] ABSTRACT

A slip-controlled hydraulic brake system with improved operational reliability during the slip control phase of operation has a master cylinder having shortened overall axial length. The master cylinder includes a valve-opening mechanism of one central control valve supported on the bottom of the longitudinal bore of the master cylinder, and the valve-opening mechanism of another central control valve supported on the secondary piston wherein during a slip control action, in the presence of a predetermined travel of the pistons of the master cylinder, a force component is generated that increases the reliability of the opening of the central control valves.

11 Claims, 4 Drawing Sheets

BRAKE SYSTEM WITH SLIP CONTROL

BACKGROUND OF THE INVENTION

The present invention relates to a brake system having slip control. The system includes a pedal-actuated (preferably, auxiliary-force-assisted) braking pressure generator including a master cylinder comprising a longitudinal bore, a primary piston and a secondary piston. The wheel brakes are connected to the braking pressure generator by main brake lines. The system further includes at least one auxiliary-pressure hydraulic pump, as well as wheel sensors and electronic circuits for determining the wheel rotational behavior and for generating electric braking-pressure control signals which, for the purpose of slip control, serve to control electromagnetically actuatable pressure-fluid inlet valves and outlet valves provided in the pressure-fluid lines. Also first and second central control valves are provided whose actuation is effected in opposition to the actuating direction of the master cylinder. Each control valve is provided with a valve-opening mechanism which, in the brake's release position, opens pressure-fluid connections between a pressure fluid supply reservoir and a primary and a secondary pressure chamber and closes these pressure-fluid connections in the braking position.

A slip-controlled brake system of this type is disclosed in the German published patent application P 36 01 914. The hydraulic brake system described therein comprises a master cylinder having a vacuum brake power booster connected upstream thereof and an auxiliary-pressure supply system. Connected to each working chamber of the master cylinder are one or more of the wheel brakes, the auxiliary-pressure supply system and; via a control valve, a pressure-compensating reservoir. The piston in the master cylinder assumes an end position proximate the brake pedal side of the master cylinder when the brake is not applied. In this position, the valve is open and establishes a connection to the reservoir. Upon brake application, the valve closes and remains closed as long as the pressure in the working chamber of the master cylinder (as initiated by the pedal depression) remains less than the auxiliary pressure. Upon commencement of slip control, the auxiliary-pressure supply system is switched on resulting in the delivery of pressure fluid into the working chamber. As a consequence thereof, the piston in the master cylinder is reset to its pedal side end position. The control valve is opened to such an extent and/or for a sufficient period for the forces at the piston to reassume a state of balance. Accordingly, a controlled pressure proportional to the pedal force will prevail in the working chamber after the auxiliary-pressure supply system is activated. By means of switchable multidirectional control valves (namely inlet and oulet valves which are provided in the pressure-fluid conduits from the wheel brakes to the master cylinder and to the reservoir) the braking pressure will be varied when a wheel becomes unstable and the brake slip will be thereby regulated.

In another prior brake system having a vacuum brake power booster, the two hydraulic circuits are separated by an auxiliary-pressure hydraulic pump connected to each individual circuit in order to improve the operational reliability in a slip control action. However, one shortcoming of this known brake system is that the resetting springs of the two pistons in the tandem master cylinder (the master cylinder being connected downstream from the vacuum brake power booster) are not in a position to forcefully open the central control valves during a brake slip control action, during which high hydraulic pressure prevails in the two pressure chambers. Another shortcoming of this known brake system is the considerable overall axial length of the master cylinder that is connected downstream from the vacuum brake power booster, which has adverse effects principally when mounting the braking pressure generator in the engine compartment of an automotive vehicle.

SUMMARY OF THE INVENTION

Therefore, it is an object of the present invention to provide an improved brake system of the type referred to without adversely effecting its functional reliability and having a considerably reduced overall axial length of the master cylinder. A further object is to assure that the central control valves will be reliably opened in the presence of high pressure.

These objects are achieved according to the present invention in that the valve-opening mechanism of the second central control valve is anchored on the bottom of a longitudinal bore of the master cylinder, and the valve-opening mechanism of the first central control valve is anchored on the secondary piston, and further in that hydraulic means are provided which, during a slip control action, in the presence of a predetermined travel of the pistons of the master cylinder, generate a force component which effects reliable opening of the central control valves.

BRIEF DESCRIPTION OF THE DRAWING

The invention will be better understood after reading the following Detailed Description of a Preferred Embodiment with reference to the accompanying drawing in which.

DETAILED DESCRIPTION OF A PREFERRED EMBODIMENT

Figure 1:
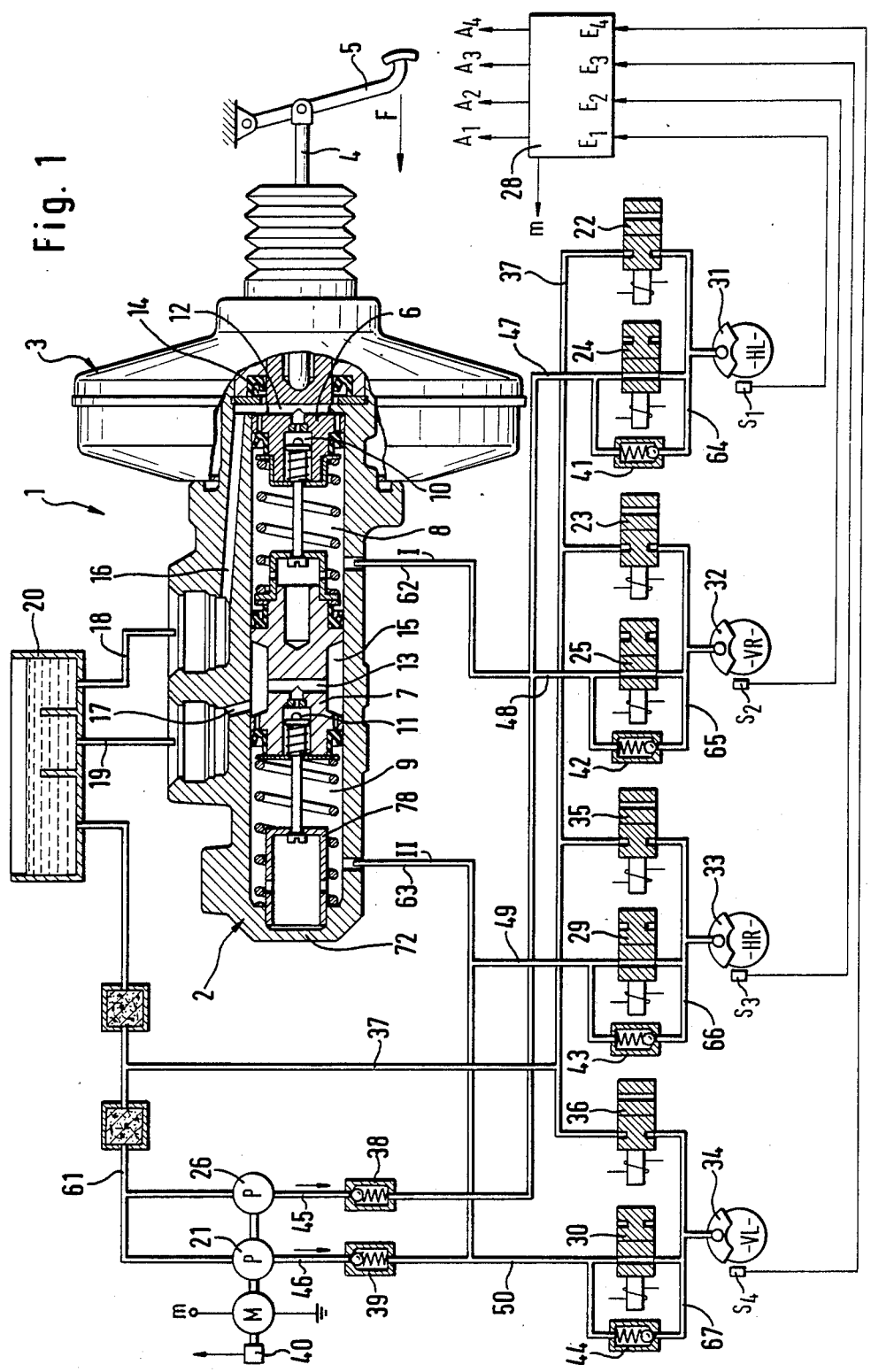
FIG. 1 is a partial cross sectional and schematic representation of a slip-controlled brake system according to the present invention showing details of construction and operation.

In the embodiment shown in FIG. 1, the inventive brake system comprises as braking pressure generator 1 and a hydraulic unit which is substantially composed of a tandem master cylinder 2 and a vacuum booster 3 connected upstream thereof. The pedal force F applied on a brake pedal 5 is transmitted by a pushrod 4 in a known fashion onto the vacuum booster 3 is boosted by auxiliary force and applied to a primary piston 6 and a secondary piston 7 of the tandem master cylinder 2.

In the shown release position of the brake, both the primary and the secondary chambers 8, 9 of the master cylinders 2 are in communication with a pressure-compensating and pressure-fluid supply reservoir 20 by way of open central control valves 10, 11, connecting channels 12, 13, supply chambers 14, 15, connecting bores 16, 17 and the hydraulic lines 18, 19.

The two brake circuits I, II of the master cylinder 2 communicate with the wheel brakes 31, 32; 33, 34 through electromagnetically actuatable inlet valves 24, 25 and 29, 30 which are normally open in their de-energized state. The parallel connected wheel brakes 31, 32 and 33, 34, respectively, are connected to diagonal wheels of the vehicle.

The wheel brakes 31, 32, 33, 34 are also connected to electromagnetically actuatable outlet valves 22, 23 and 35, 36, respectively, which are normally closed in their de-energized state and which, by way of a hydraulic return line 37, are in communication with the pressure-compensating reservoir 20, on the one hand, and, by way of the suction line 61, communicate with the suction sides of the auxiliary-pressure pumps 21, 26, on the other hand. The pumps are hydraulic pumps by the motor M. The electrical connections 'm' and ground are likewise illustrated symbolically. There is also provided an electrically operating function-monitoring device, monitoring circuit 40, which monitors the mode of operation of the motor M.

The vehicle wheels are equipped with inductive sensors $S_1$, $S_2$, $S_3$ and $S_4$ which cooperate with a toothed disc co-rotating synchronously to the wheel rotation and which generate electric signals indicative of the wheel rotational behavior, that is, the wheel speed and variations thereof. These signals are fed to the inputs $E_1$, $E_2$, $E_3$ and $E_4$ of an electronic signal-processing and combining circuitry 28 which generates braking-pressure control signals serving to temporarily switch over the inlet and outlet valves 22, 23, 24, 25, 29, 30, 35, 36 on detection of an imminent locked condition and to thereby appropriately keep the braking pressure constant, decrease it and to re-increase it at the appropriate times. To do this, the actuating magnets of the inlet and outlet valves are driven by the outputs $A_1$, $A_2$, $A_3$ and $A_4$. The electric connecting lines between the ports $A_1$, $A_2$, $A_3$ and $A_4$ and the coils of the valves 22, 23, 24, 25, 29, 30, 35, 36 are not illustrated for the sake of simplicity.

The circuitry 28 can be realized in a known fashion by hard-wired circuits or by programmed electronic units, such as microcomputers or microcontrollers.

The turn-on signal for staring the drive motor M of the auxiliary-pressure pumps 21, 26 which motor is required to run during a slip control operation is applied to the connection m of the motor M.

The brake system operates as follows:

On brake application, the pedal force F boosted by the difference in pressure in the booster 3 is transmitted onto the master cylinder pistons 6, 7. The central control valves 10, 11 close, thus allowing braking pressure to develop in the pressure chambers 8, 9 and hence in the brake circuits I, II which propagates by way of the valves 24, 25 and 29, 30, respectively, to the wheel brakes 31, 32 and 33, 34, respectively.

On detection of an imminent locked condition at one or more of the wheels by means of the sensors $S_1$, $S_2$, $S_3$ and $S_4$ and the circuitry 28, slip control will commence. The drive motor M of the auxiliary-pressure pumps 21, 26 will be switched on. Pressure develops in the two supply lines 45, 46 which is applied to the wheel cylinders of the wheel brakes 31, 32, 33, and 34 through the non-return valves 38, 39, the branch lines 47, 48 and 49, 50, respectively, the inlet valves 25, 26 and 29, 30, respectively, and also to upon the pressure chambers 8, 9 of the master cylinder 2.

A signal from the circuitry 28 results in change-over of the electromagnetically actuatable inlet valves 24, 25 and 29, 30, respectively, and thus causes closure of the brake circuits I, II and the branch lines 47, 48, 49 and 50, respectively. Further displacement of the master cylinder pistons 6, 7 in the actuating direction as well as emptying of the pressure chambers 8, 9 is prevented, because the pressure fluid from the auxiliary-pressure pumps 21, 26 flows through the supply lines 45, 46, the opened non-return valves 38, 39 and the main brake lines 62, 63 into the pressure chambers 8, 9 and accordingly urges the master cylinder pistons 6, 7 back to their initial positions. The actual braking pressure variation in the wheel brakes 31, 32, 33 and 34 is determined by the inlet and outlet valves 29, 30, 35, 36, which are provided with further slip-controlling braking-pressure control signals over the lines $A_1$, $A_2$, $A_3$ and $A_4$.

As can be seen from the drawing that the inlet valves 24, 25 and 29, 30, respectively are protected by non-return valves 41, 42 and 43, 44, respectively which are connected in parallel in bypass lines 64, 65, 66, 67. In special cases, these non-return valves 41, 42 and 43, 44, respectively, permit a termination of the braking pressure control and release of the wheel brakes, respectively, since pressure fluid can flow back from the wheel brakes 31, 32, 33 and 34 into the pressure chambers 8, 9, with the inlet valves 24, 25 and/or 29, 30 and the outlet valves 22, 23 and/or 35, 36, closed, provided that the pistons 6, 7 of the master cylinder 2 have been returned to their initial position and the central control valves 10, 11 are in their opened condition.

Figure 2:
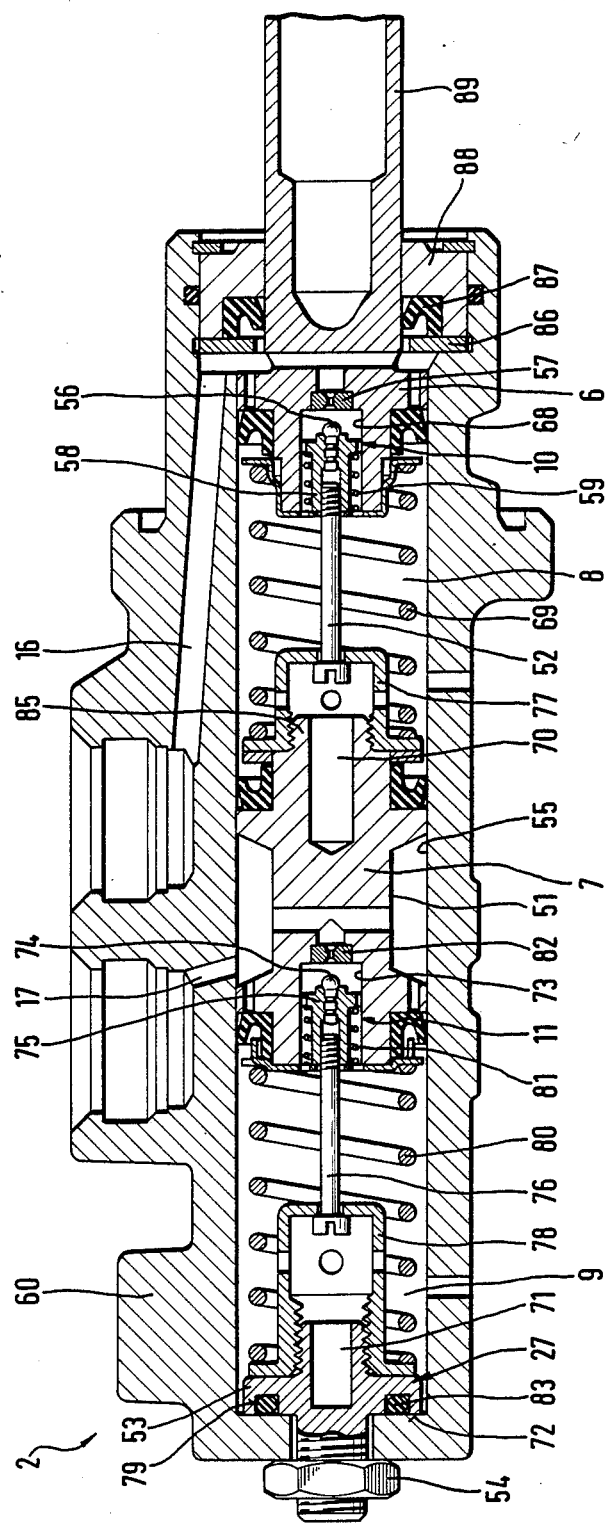
FIG. 2 is a cross sectional view of a master cylinder used in the slip-controlled brake system according to FIG. 1.

As shown in FIG. 2, the master cylinder 2 comprises a master cylinder housing 60 in whose longitudinal bore 55 the primary piston 6 is axially slidably guided and which is acted upon by a first resetting spring 69 that is supported on the secondary piston 7. In this arrangement, the central-control-opening mechanism of the secondary piston 7 is supported on the bottom 72 of the longitudinal bore 55 by means of a second stop sleeve 78 and a second resetting spring 80 taking support thereon. While the second stop sleeve 78 is pressed into the bottom 72 in the embodiment shown in FIG. 1, the arrangement according to FIG. 2 is preferably chosen such that it cooperates with a threaded portion 27 which extends through an axial bore in the bottom 72 and is retained against axial displacement by means of a lock nut 54. The threaded portion 27 is furnished with a radial flange 53 in whose axial recess 79 a seal 83 is incorporated which ensures sealing of the secondary pressure chamber 9 toward the outside. Finally, the threaded portion 27 contains an axial recess 71 for accommodating a stop screw 76 of the second central valve 11.

As mentioned hereinabove, the spring assembly of the primary piston 6 is supported on the secondary piston 7. The first resetting spring 69 is supported on a first stop sleeve 77 which is fixed to, preferably screwed to, an axial smaller-diameter portion 85 of the secondary piston 7. The secondary piston 7 also comprises an axial recess 70 which serves to accommodate a stop screw 52 of the first central control valve 10, with the primary piston 6 being provided with an axial stem 89 which is sealed by means of a sealing sleeve 87 and is guided in a closure member 88 that closes the longitudinal bore 55 to the outside. In the illustrated position, the primary piston 6 takes support on a perforated disc 86 which prevents the sealing sleeve 87 from displacing in an axial direction.

Figure 3:
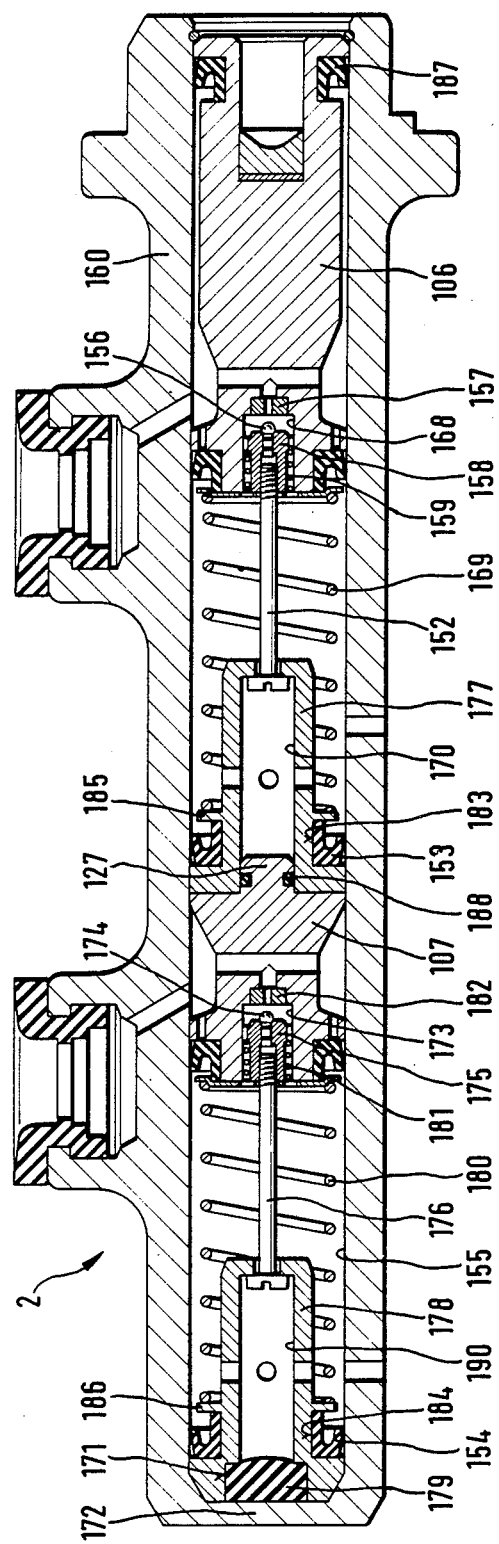
FIG. 3 is a cross sectional view of an alternative embodiment of a master cylinder for use in the slip-controlled brake system according to FIG. 1; and, FIG. 4 is an enlarged cross sectional view of the central control valve used in the master cylinder shown in the slip-controlled brake system of FIG. 1.

The tandem master cylinder 2 shown in FIG. 3 comprises a master cylinder housing 160 having a primary piston 106 axially slidably guided in its longitudinal bore which is acted upon by a first resetting spring 169 that is supported on the secondary piston 107. In this arrangement, the first resetting spring 169 takes support on an annular surface 185 of a first stop sleeve 177 whose axial bore 170 serves to accommodate a stop screw 152 of the first central control valve 110. The end of the primary piston 106 proximate the vacuum brake power booster is furnished with a sealing sleeve 187 for sealing the master cylinder 2 to the outside.

The side of the annular surface remote from the first resetting spring 169 confines a radial groove 183 which is provided in the first stop sleeve 177 and which accommodates a first sealing sleeve 153 in a manner such as to isolate the primary pressure chamber 108 from the supply chamber 115 of the second pressure chamber 109 upon actuation of the master cylinder 2. In this arrangement, the first stop sleeve 177 cooperates with the secondary piston 107 whose axial extension 127 is of smaller diameter and projects into the axial bore 170 of the stop sleeve 177 and is statically sealed therein by means of a ring seal 188. The secondary piston 107 is acted upon by a second resulting spring 180 which takes support on an annular surface 186 of a second stop sleeve 178, whose axial bore 190 serves to accommodate a second stop screw 176 of the second central control valve 111. Similar to the construction of the first stop sleeve 177, the side of the annular surface 186 remote from the second resetting spring 180 bounds a radial groove 184 in which a second sealing sleeve 154 is located which ensures dynamic sealing of the second stop sleeve 178 in relation to the longitudinal bore 155. Static sealing of the second stop sleeve 178 is performed by a sealing element 179 that is located in the sleeve's stepped bore 171 which abuts on the bottom 172 of the longitudinal bore 155.

The inventive arrangements provide that, when the pressure chambers 108, 109 are supplied with high pressure fluid during slip control operation, the hydraulic forces will act on the two stop sleeves 177, 178 which prevent lifting of the sleeves from the secondary piston 107 and/or the bottom 172, which thereby ensures reliable opening of the central control valves 110, 111 at a predetermined travel of the two master cylinder pistons 106, 107.

Figure 4:
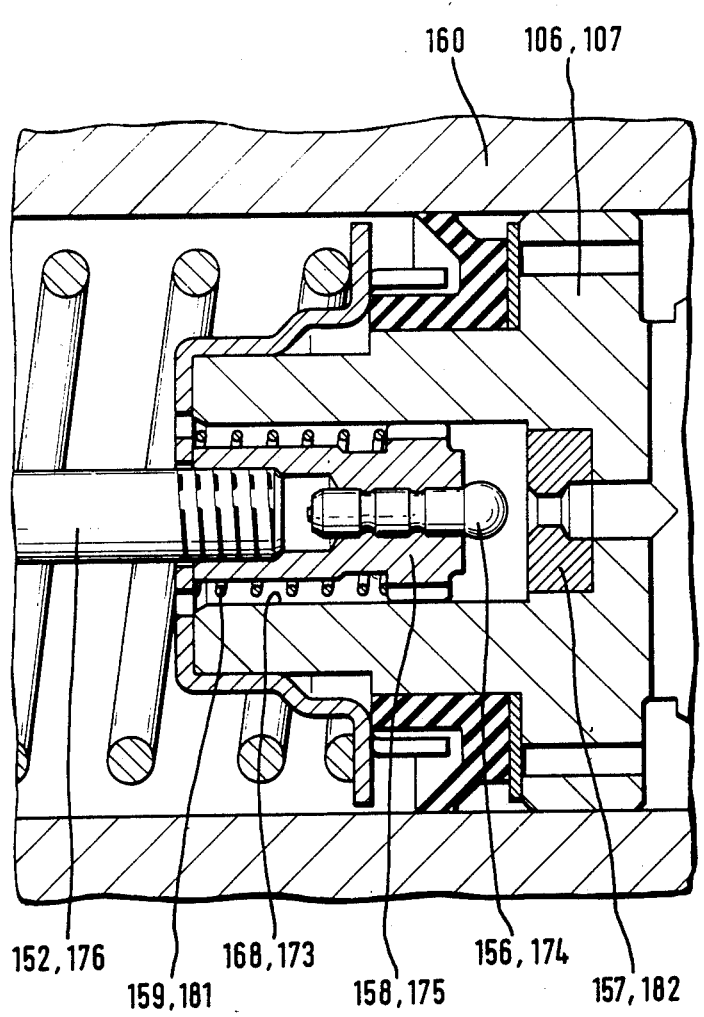

The central control valves 10, 11 and/or 110, 111, are shown in FIG. 4. As can be seen from FIG. 4, the central valves are composed of a holder 158, 175 which is slidably supported in an axial recess 168, 173 of the primary 106 and secondary piston 107, which holder is in operative engagement with the above-mentioned stop screw 152, 176 and lifts a valve ball 156, 174 serving as a valve closure member from its valve seat 157, 182 in the release position. The holder 158, 175 including the ball 156, 174 is biased in the actuating direction by means of a closure spring 159, 181 which bears against a bowl-shaped part, not referred to in more detail. Closing of the central control valves 110, 111 is effected in a direction opposite to the actuating direction of the master cylinder 2.

The function and operation of the central control valves 10, 11 are well known and need not be explained in and further detail herein for an understanding of the present invention.

What is claimed is:

1. A brake system including slip control means comprising a pedal-actuated, braking pressure generator including a master cylinder having a longitudinal bore, a primary piston and a secondary piston in said bore; wheel brakes hydraulically connected by main brake lines to said braking pressure generator; at least one auxiliary-pressure hydraulic pump; wheel sensor means and electronic circuit means for determining wheel rotational behavior and for generating electric braking-pressure control signals which, for the purpose of slip control, control electromagnetically actuatable pressure-fluid inlet valves and outlet valves in the brake lines; a first and a second central control valve in said master cylinder actuated in a direction opposite to an actuating direction of the master cylinder; each central control valve having a valve-opening mechanism which, in a brake release position, opens pressure-fluid connections between a pressure fluid supply reservoir and a primary and a secondary pressure chamber of said master cylinder and closes said pressure-fluid connections in a braking position; the valve-opening mechanism of the second central control valve being supported on a bottom portion of the longitudinal bore of the master cylinder and the valve-opening mechanism of the first central control valve being supported on the secondary piston, and hydraulic means generating a force component acting on said valve opening mechanisms to effect opening of the central control valves during a slip control action, in the presence of a predetermined travel of the primary and secondary pistons of the master cylinder, wherein the valve-opening mechanism of the second central control valve is supported by a stop sleeve engaged with a housing of the master cylinder, wherein the stop sleeve is attached to a threaded portion which penetrates the bottom of the longitudinal bore of the master cylinder and is secured to the housing with a lock nut, and, wherein the threaded portion comprises a radial flange including an axial recess a seal being arranged in the recess to seal the stop sleeve relative to the bottom of the longitudinal bore.

2. The brake system as claimed in claim 1, wherein the threaded portion includes an axial blind bore for accommodating a stop screw of the second central control valve.

3. The brake system as claimed in claim 1, wherein the valve-opening mechanism of the first central control valve is supported by means of a second stop sleeve which is engaged with the secondary piston.

4. The brake system as claimed in claim 3, wherein the second stop sleeve is threadedly attached to the secondary piston.

5. The brake system as claimed in claim 3, wherein the secondary piston includes an axial bore for accommodating a stop screw of the first central control valve.

6. A brake system including slip control means comprising a pedal-actuated, braking pressure generator including a master cylinder having a longitudinal bore, a primary piston and a secondary piston in said bore; wheel brakes hydraulically connected by main brake lines to said braking pressure generator; at least one auxiliary-pressure hydraulic pump; wheel sensor means and electronic circuit means for determining wheel rotational behavior and for generating electric braking-pressure control signals which, for the purpose of slip control, control electromagnetically actuatable pressure-fluid inlet valves and outlet valves in the brake lines; a first and a second central control valve in said master cylinder actuated in a direction opposite to an actuating direction of the master cylinder; each central control valve having a valve-opening mechanism which, in a brake release position, opens pressure-fluid connections between a pressure fluid supply reservoir and a primary and a secondary pressure chamber of said master cylinder and closes said pressure-fluid connections in a braking position; the valve-opening mechanism of the second central control valve being supported on a bottom portion of the longitudinal bore of the master cylinder and the valve-opening mechanism of the first central control valve being supported on the secondary piston, and hydraulic means generating a force component acting on said valve opening mechanisms to effect opening of the central control valves during a slip control action, in the presence of a predetermined travel of the primary and secondary pistons of the master cylinder, wherein the hydraulic means includes a first and a second stop sleeve disposed in the longitudinal bore, each dynamically sealed to the bore; the first stop sleeve cooperates with the secondary piston and the second stop sleeve cooperates with the bottom of the longitudinal bore, wherein the first and the second stop sleeve are statically sealed in relation to the secondary piston and the bottom of the longitudinal bore, and, wherein the secondary piston includes an axial extension at an end proximate to the primary piston, said extension projects into an exial bore in the first stop sleeve, and further comprising a ring seal on said extension.

7. The brake system as claimed in claim 6, wherein the second stop sleeve is pressed into the bottom of the longitudinal bore.

8. The brake system as claimed in claim 6, wherein the dynamic sealing of the stop sleeves is performed by means of a first and a second sealing sleeve.

9. The brake system as claimed in claim 8, wherein the dynamic sealing of the first stop sleeve includes the first sealing sleeve adapted to isolate the primary chamber from a supply chamber of the secondary chamber upon actuation of the master cylinder.

10. The brake system as claimed in claim 6, wherein the static sealing of the second stop sleeve to the bottom of the longitudinal bore includes an elastic sealing element arranged in a stepped bore in the second stop sleeve supported on the bottom of the longitudinal bore.

11. A brake system including slip control means comprising a pedal-actuated, braking pressure generator including a master cylinder having a longitudinal bore, a primary piston and a secondary piston in said bore; wheel brakes hydraulically connected by main brake lines to said braking pressure generator; at least one auxiliary-pressure hydraulic pump; wheel sensor means and electronic circuit means for determining wheel rotational behavior and for generating electric braking pressure control signals which, for the purpose of slip control, control electromagnetically actuatable pressure-fluid inlet valves and outlet valves in the brake lines; a first and a second central control valve in said master cylinder actuated in a direction opposite to an actuating direction of the master cylinder; each central control valve having a valve-opening mechanism which, in a brake release position, opens pressure-fluid connections between a pressure fluid supply reservoir and a primary and a secondary pressure chamber of said master cylinder and closes said pressure-fluid connections in a braking position; the valve-opening mechanism of the second central control valve being supported on a bottom portion of the longitudinal bore of the master cylinder and the valve-opening mechanism of the first central control valve being supported on the secondary piston, and hydraulic means generating a force component acting on said valve opening mechanisms to effect opening of the central control valves during a slip control action, in the presence of a predetermined travel of the primary and secondary pistons of the master cylinder, wherein the hydraulic means includes a first and a second stop sleeve disposed in the housing longitudinal bore, each dynamically sealed to the bore, the first stop sleeve cooperates with the secondary piston and the second stop sleeve cooperates with the bottom of the longitudinal bore, wherein the dynamic sealing of the stop sleeves is performed by means of a first and a second sealing sleeve, and, wherein each sealing sleeve is arranged in a radial groove in a respective one of the stop sleeves, said grooves defined by axially outwardly annular surfaces each stop sleeve, on which a first and a second resetting spring are respectively supported.

* * * * *